(No Model.) 3 Sheets—Sheet 1.

G. LEUFFGEN.
GLASS MELTING FURNACE.

No. 270,594. Patented Jan. 16, 1883.

Witnesses:
B. E. Stafford
Charles C. Stetson

Inventor:
George Leuffgen
by his attorney
T. D. Stetson

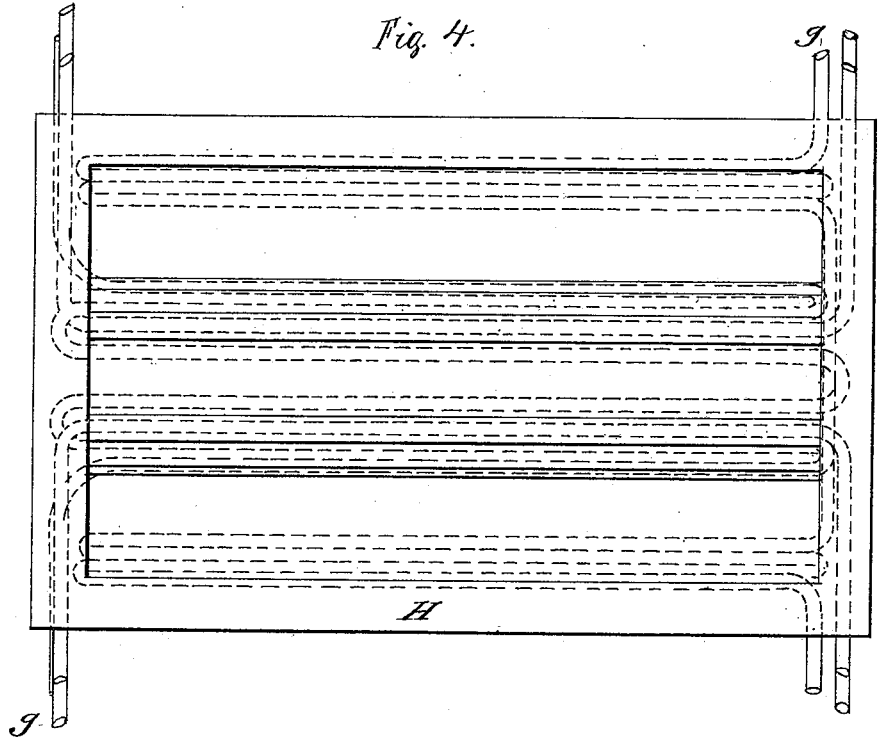
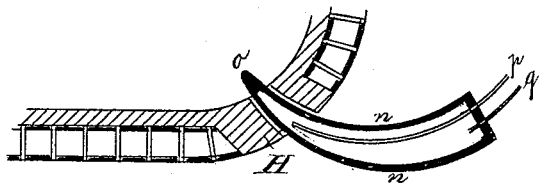

(No Model.) 3 Sheets—Sheet 3.

G. LEUFFGEN.
GLASS MELTING FURNACE.

No. 270,594. Patented Jan. 16, 1883.

Witnesses:
B. E. S. Stafford.
Charles C. Stetson.

Inventor:
George Leuffgen
by his attorney
T. D. Stetson.

UNITED STATES PATENT OFFICE.

GEORGE LEUFFGEN, OF BERLIN, ASSIGNOR TO CHR. AUGUST WILHELM SCHÖN, OF HAMBURG, GERMANY.

GLASS-MELTING FURNACE.

SPECIFICATION forming part of Letters Patent No. 270,594, dated January 16, 1883.

Application filed March 10, 1882. (No model.) Patented in Germany October 13, 1881.

*To all whom it may concern:*

Be it known that I, GEORGE LEUFFGEN, a resident of Berlin, Prussia, in the German Empire, have invented certain new and useful Improvements in Glass-Melting Furnaces, of which the following is a specification.

My invention relates to the construction of melting vats or vessels in furnaces for continuous or intermittent working, and the object is to produce glass absolutely free of clay or other impurities. The glass may be drawn from the melting-vessl by tapping the latter, or taken out of it by the usual blow-pipe.

Figure 1:
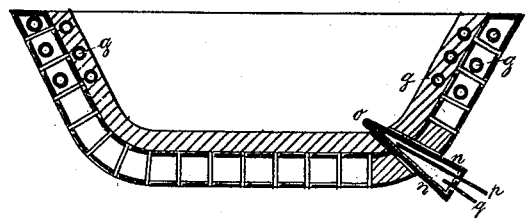
Figure 2:
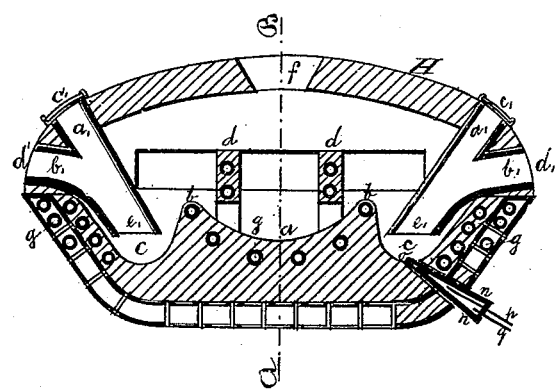
Figure 3:
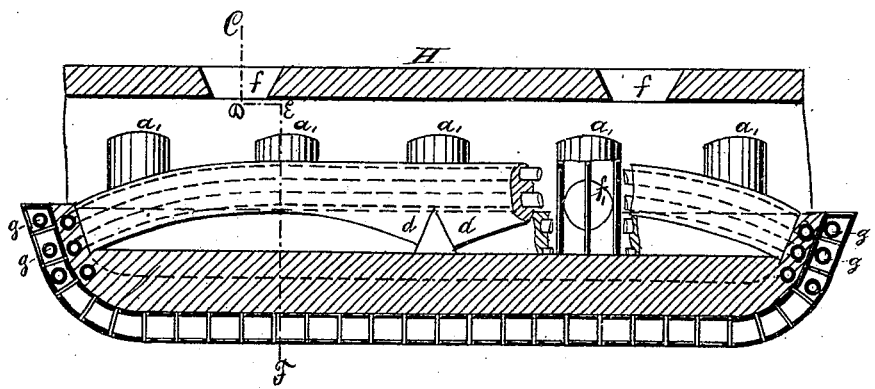
Figure 6:
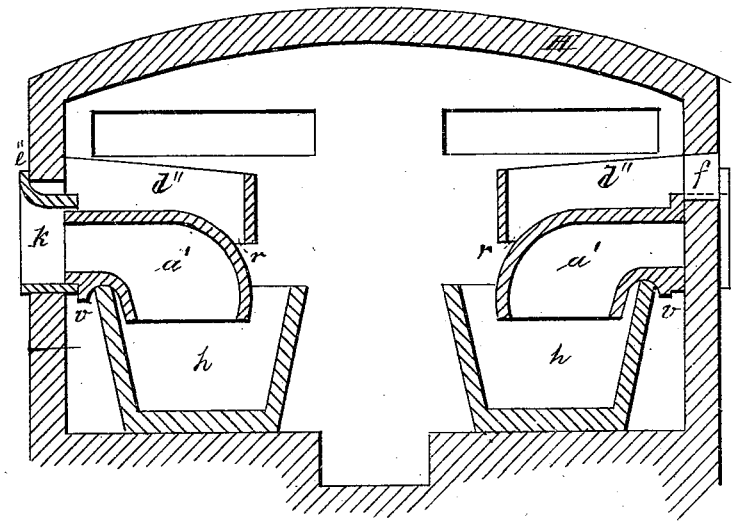
Figure 7:
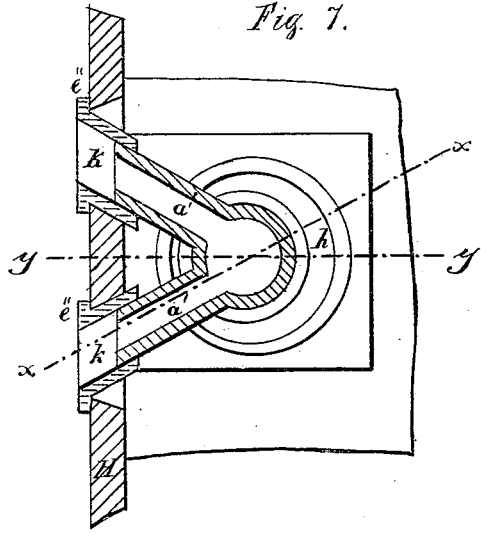
Figure 8:
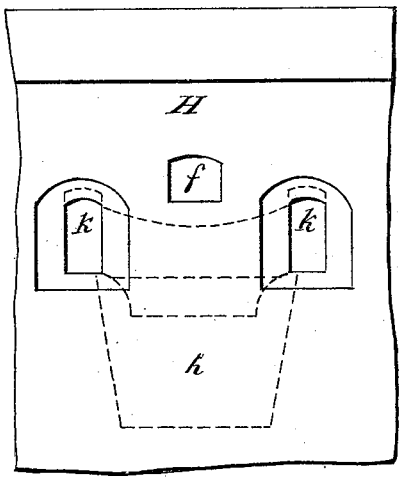

In the accompanying drawings, which form a part of this specification, Figure 1 shows a vertical cross-section of a melting-vessel provided with an improved tapping-stopper. Figs. 2 and 3 are vertical and longitudinal sections, in the lines C D, E F, and A B of each other, of a melting vessel or furnace provided with means for furnishing pure glass for casting purposes or for work with the blow-pipe. Fig. 4 is a plan view, showing the arrangement of the cooling-pipes. Fig. 5 shows a modification of the tapping-plug. Figs. 6, 7, 8 show the dip-bonnets used for continuous work applied to the pot-work. Fig. 6 is a vertical section, the left-hand side being taken on a line, as $x\,x$, Fig. 7, and the right-hand portion being taken on a line, as $y\,y$, Fig. 7. Fig. 7 is a horizontal section through one of the double-branched channels, showing the adjacent parts. Fig. 8 is a side elevation of such a portion as is shown in Fig. 7.

Similar letters indicate corresponding parts.

As the most important part of the glass-melting process is the production of a pure glass, free of any impurities, and as the only known means to close the tapping-hole on melting-vats was a stopper or plug of clay, it was impossible to use these vats for drawing the fluid glass intermittently from these, though they answered to all other demands, because the clay of the plug is dissolved by the fluid glass, and the latter thereby spoiled. The present invention does away with the clay plug, replacing it by a hollow iron one, Figs. 1, 2, and 5, which is cooled by a stream of water, air, or any suitable fluid, and which is brought to its place or removed from it by mechanism—as eccentric toggle-lever, gearing, or any other suitable device. The cooling-fluid, entering the hollow plug $n$ through the pipe $p$, leaves it through the pipe $q$. The front end, $o$, of the plug, being in proportion thicker than the walls, becomes hot and the glass adheres to it, so that the plug $n$, in being removed, draws the fluid glass after it. By this arrangement any portion of the glass in the melting-vat may be drawn with the greatest ease at any time, and the bulky vats or vessels for large work, which before could be emptied only by tilting, necessitating heavy machinery and much space, can now be made stationary and be emptied by means of this new tapping-plug. It must be understood that on one vessel not only one plug can be used, but as many as are convenient or suitable to the work and the quantity of glass. The shape of the plug may also be varied within wide limits. In Figs. 1 and 2 it is straight and conical; in Fig. 5 curved, the latter supposed to be drawn by a rotating device. Fig. 1 shows its application to a melting-vat of smaller size; Fig. 2, to a larger stationary vessel of peculiar construction. Prior to the invention of my cooled plug such a melting-vessel could not be used at all, as it could not be emptied in the required time. Now it is possible to melt continuously in it, to work with blow-pipes, and to draw from it large or small quantities of glass, just as the work requires.

H indicates the masonry body of the furnace.

The melting vessel or furnace consists, in the most approved form, of an outer casing of two iron shells separated from each other by stays, and cooled on those places which are exposed to the heat by any cooling-fluid streaming through and spouting from the pipes $g$ against the plates. The bottom is lined with refractory material, and is formed with a central shallow trough or tray, $a$, and on the sides of it two deeper troughs, $c\,c$. Those portions of the lining exposed to the heat are protected by cooling-pipes embedded in the lining. The whole vessel is arched over, provisions being made for the necessary openings for feeding in the material at $f\,f$, for working at $d'$, and for observing at $e'$. The heat enters and leaves the furnace through suitable openings of the end walls. The trough $a$ is charged through the openings $f$ with material, which is melted down, adding new material at regular intervals, until the fluid, after overflowing the two high ridges $b$ of the bottom $a$, fills the two troughs $c$ to the suitable height. To prevent unmolten material from passing the ridges $b$, two narrow pipe-cooled arches or beams, $d\ d$, are stretched over and along the trough $a$, so that the highest part of the opening of the arches is lower than the ridge $b$. Only the molten glass can by this arrangement flow from under the arches $d$ over the ridges $b$. All the scum and impurities accidentally mixed in the material are retained by the arches $d$. The most advantageous arrangement of the cooling-pipes is that shown in Fig. 4. Greater quantities of molten glass are drawn from the furnace by removing the tapping-plugs $n$. For blow-pipe work are arranged dip-bonnets, consisting of a pipe, $a'$, with a show or observation opening, $c'$, and a branch, $b'$, terminating in the working-opening $d'$. Through the branch $b'$ the glass is taken out with the blow-pipe, the workman being protected against the heat of the furnace, and still able to observe the state of the glass through the opening $c'$. The end $e'$ of the pipe $a'$ should always dip into the fluid. A modification of these bonnets, when intended for pot-work, is shown in Figs. 6, 7, 8.

$h$ represents a pot. $a'$ is the bonnet, which has two horizontal branch pipes fitting into sleeves $k$, which are somewhat smaller than the opening in the walls through which they extend, so as to be allowed a movement therein. The sleeves $k$ are made with external flanges, $e''$, so that the workmen are not molested by the heat. A half-round wall or fence, $d''$, is mounted right above the bonnet $a'$, leaving an opening, $r$. In the space so prepared the material is deposited through the feeding-opening $f$, which lies between and above the branch pipes, so that the glass in melting flows down through the opening $r$ into the pot $h$. The bonnet $a'$ is kept in its position, being hung by means of the hooks $v$ to the pot in such a way that it can rise and fall with the glass in the pot $h$, upon which it is swimming, but cannot tumble into the pot. Hereby it is possible to work continuously and with two workmen out of the same pot. The sleeves $k$ and fences $d''$ may be used on the form of tank shown in Figs. 1 to 5.

It will be understood that it is preferred to use as material in the above-described melting vats, furnaces, or pots ready-made glass in lumps, or in broken or brick-shaped pieces, notwithstanding the glass may be made also from its rough original ingredients.

I claim as my invention—

1. The hollow iron plug $n$, cooled by any suitable fluid—as water, air, compound fluids, and the like—supplied and carried off by pipes, and moved into and out of its seat or tapping-hole by suitable mechanism, substantially as shown and described, and for the purpose explained.

2. Melting vats or vessels for glass-furnaces, constructed with a material-receiving trough, $a$, working-troughs $c$, overflow-ridges $b$, and skimming arches or beams $d$, cooled where necessary by any cooling-fluid carried in pipes, substantially as shown and described.

3. Dip-bonnets $a'$, with branches $b'$ and show-openings $c'$, arranged as shown, and for the purpose explained.

4. Dip-bonnets $a'$, with horizontal branches, in combination with the sleeves $k$ and the device or fence $d''$, in combination with glass-melting pots $h$, substantially as shown and described, and for the purpose explained.

This specification signed by me this 6th day of February, 1882.

GEORGE LEUFFGEN.

Witnesses:
GEORG WEISS,
RICHARD SCHÖN.